(12) United States Patent
Hadala

(10) Patent No.: US 7,302,846 B2
(45) Date of Patent: Dec. 4, 2007

(54) TEMPERATURE-SENSING DEVICE FOR DETERMINING THE LEVEL OF A FLUID

(76) Inventor: Anthony J. Hadala, 7914 N. Gannett, Sagamore Hills, OH (US) 44067

( * ) Notice: Subject to any disclaimer, the term of this patent is extended or adjusted under 35 U.S.C. 154(b) by 49 days.

(21) Appl. No.: 10/799,459

(22) Filed: Mar. 12, 2004

(65) Prior Publication Data

US 2005/0199057 A1 Sep. 15, 2005

(51) Int. Cl.
*G01F 23/00* (2006.01)
*G01F 23/22* (2006.01)

(52) U.S. Cl. .................... 73/295; 73/292; 73/290 R
(58) Field of Classification Search .............. 73/299, 73/290 R, 295, 292
See application file for complete search history.

(56) References Cited

U.S. PATENT DOCUMENTS

| | | | | |
|---|---|---|---|---|
| 3,696,675 A | * | 10/1972 | Gilmour | 73/295 |
| 4,028,118 A | * | 6/1977 | Nakasuji et al. | 106/31.19 |
| 4,232,552 A | * | 11/1980 | Hof et al. | 374/106 |
| 4,339,207 A | * | 7/1982 | Hof et al. | 374/160 |
| 4,358,955 A | * | 11/1982 | Rait | 73/295 |
| 4,362,645 A | * | 12/1982 | Hof et al. | 252/408.1 |
| 4,854,160 A | * | 8/1989 | Glatt | 73/73 |
| 5,218,834 A | * | 6/1993 | Major et al. | 62/129 |
| 5,323,652 A | * | 6/1994 | Parker | 73/295 |
| 5,385,044 A | * | 1/1995 | Thomas et al. | 73/295 |
| 5,482,373 A | * | 1/1996 | Hutchinson | 374/141 |
| 5,707,590 A | * | 1/1998 | Thomas et al. | 422/119 |
| 5,738,442 A | * | 4/1998 | Paron et al. | 374/162 |
| 5,894,089 A | * | 4/1999 | Ogawa | 73/295 |
| 6,012,411 A | * | 1/2000 | Hochbrueckner | 116/207 |
| 6,260,414 B1 | * | 7/2001 | Brown et al. | 73/295 |
| 6,301,947 B1 | * | 10/2001 | McCombs, Jr. | 72/295 |
| 6,761,066 B2 | * | 7/2004 | Rait | 73/295 |
| 6,880,396 B2 | * | 4/2005 | Rait | 73/295 |
| 6,925,872 B2 | * | 8/2005 | Hadala | 73/295 |

\* cited by examiner

*Primary Examiner*—Hezron Williams
*Assistant Examiner*—Rodney Frank
(74) *Attorney, Agent, or Firm*—Forrest L. Collins Law Offices, LLC; Forrest L. Collins

(57) ABSTRACT

The present invention deals with determining the level of fluid in a container. Typically, a beverage container containing a liquid will absorb heat energy from the surrounding environment at a greater rate than a gaseous component in the headspace of the beverage container. Thus, as the liquid is drawn from a beverage container a greater headspace results. If a thermometric measuring device is employed along the height of the beverage container the volume may be determined by observing the difference in the temperature along the height of the beverage container. In practice, a beer keg may exhibit a difference of as much as 9° Fahrenheit on the exterior surface of the beer keg when measured at the headspace as opposed to the area where the liquid is present in the beverage container.

15 Claims, 5 Drawing Sheets

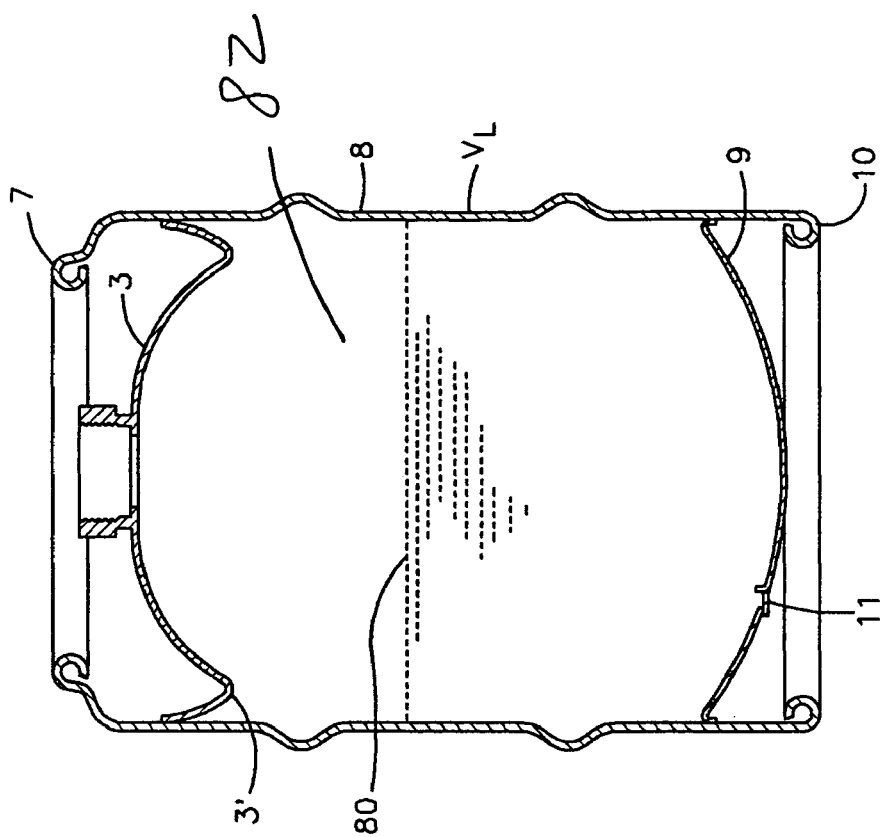
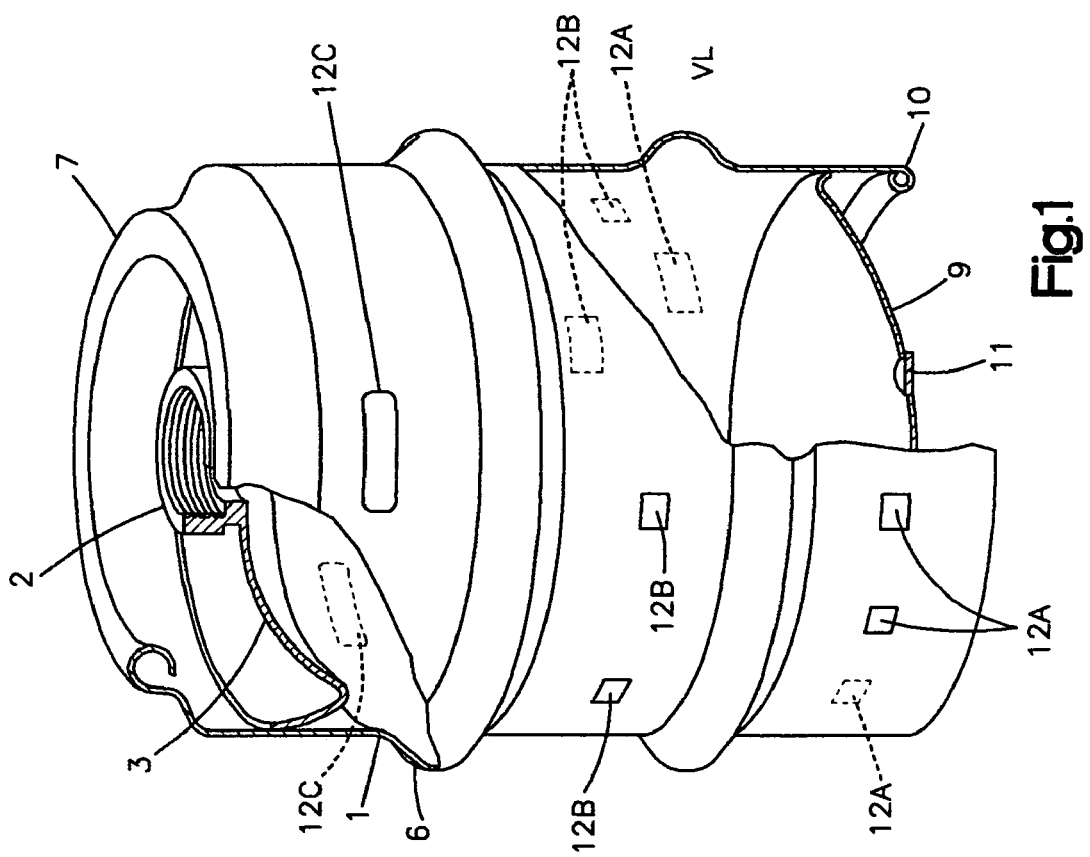

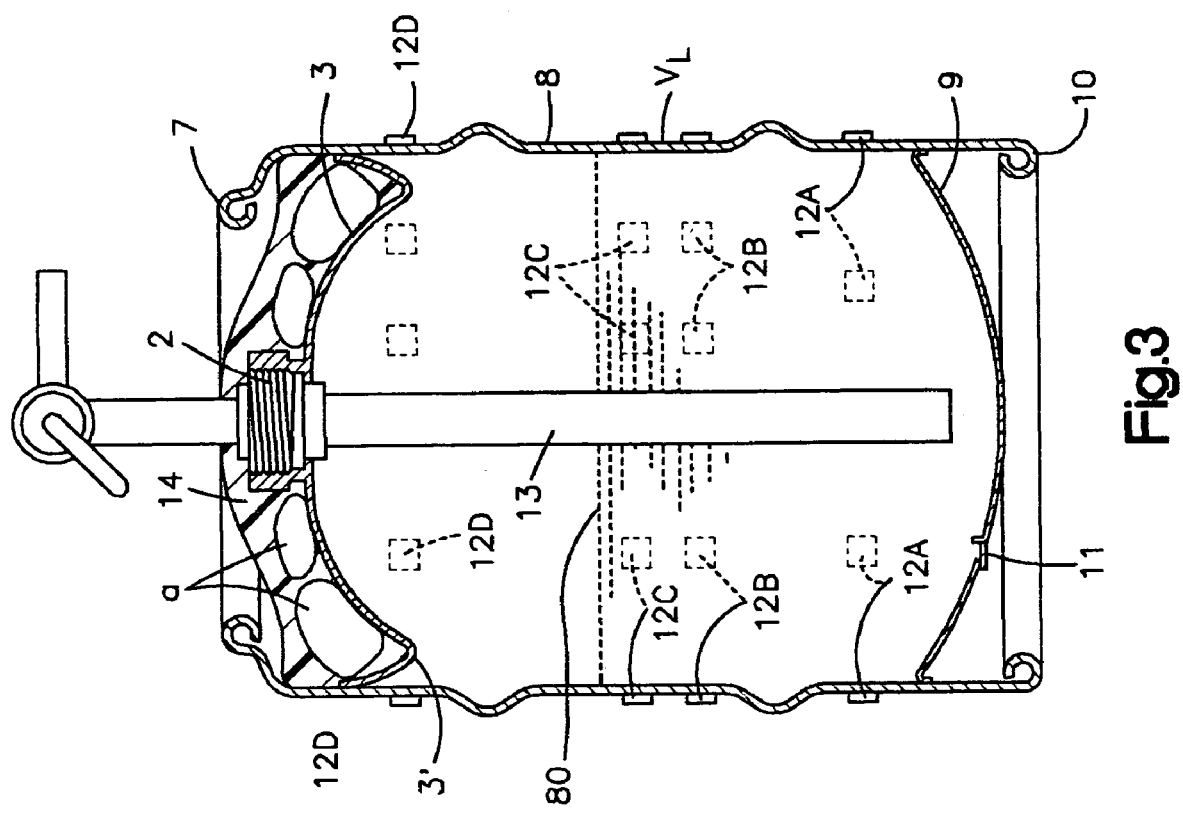

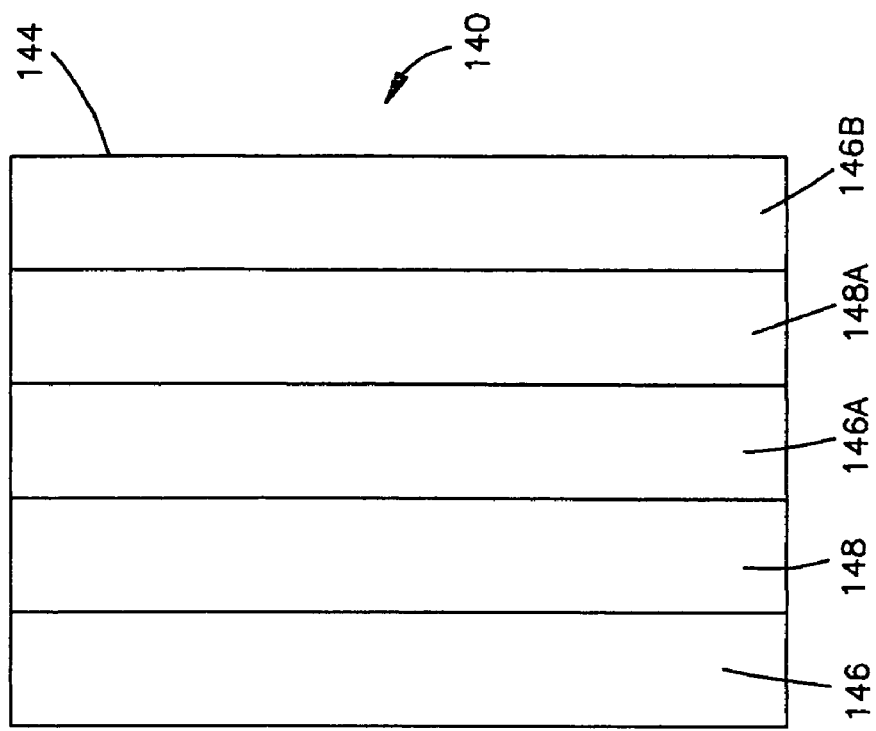
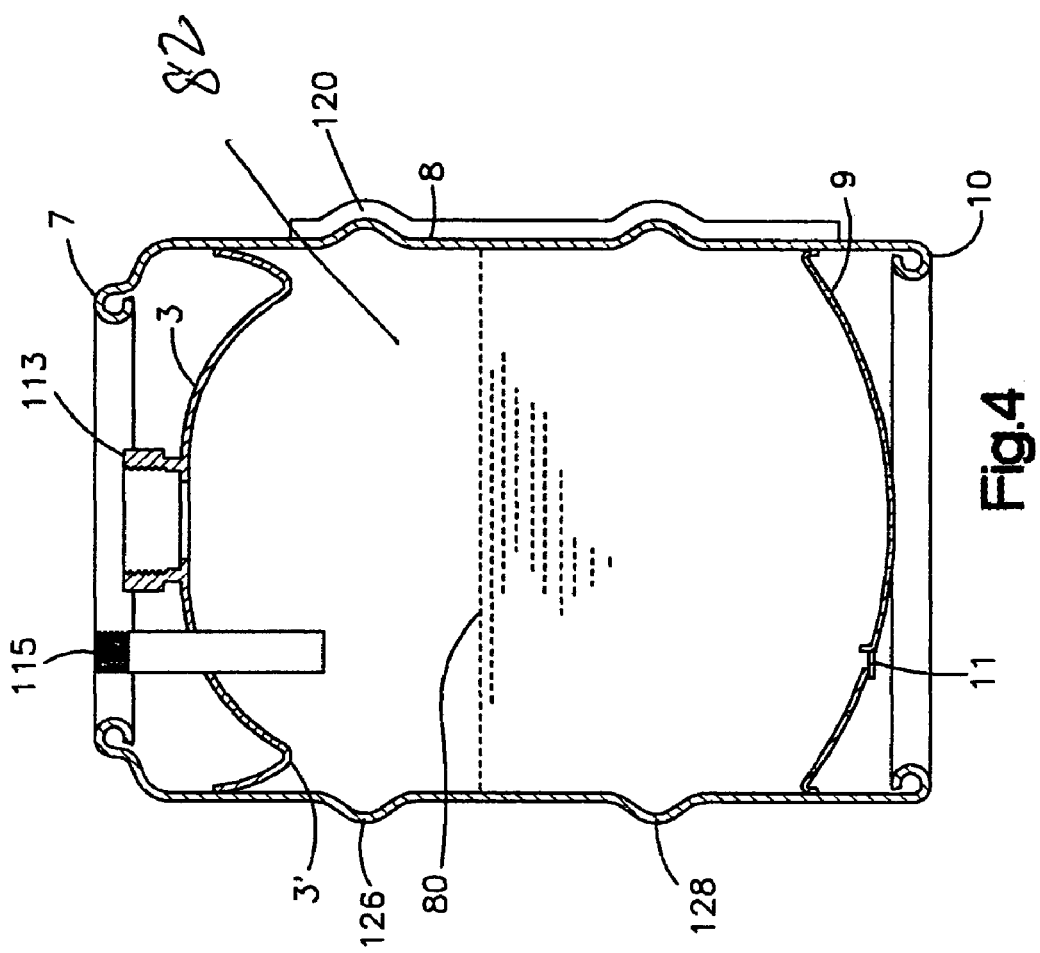

TEMPERATURE-SENSING DEVICE FOR DETERMINING THE LEVEL OF A FLUID

CROSS-REFERENCE TO RELATED APPLICATION

This application claims the benefit of U.S. patent application Ser. No. 09/992,610 filed 19 Nov. 2001 and U.S. patent application Ser. No. 09/792,663 filed Feb. 23, 2001. U.S. patent application Ser. No. 09/992,610 filed 19 Nov. 2001 and Ser. No. 09/792,663 filed 23 Feb. 2001 are specifically incorporated herein.

BACKGROUND OF THE INVENTION

1. Field of the Invention

The present invention relates to determining the level of fluid in a container and the like.

2. Description of the Art Practices

U.S. Pat. No. 6,260,414 to Brown, et al., issued Jul. 17, 2001 recites a cholesteric liquid crystal fluid level indicator that determines the level of a cooled liquid, such as beer, in a closed, opaque keg when placed in thermal contact with the exterior surface of the keg, by producing a color change that is a function of the liquid temperature when the liquid is within a predetermined temperature range, the indicator comprises a multiple level strip having a top transparent layer, liquid crystal layer, a black background layer and an attachment layer employing a protected adhesive on its bottom surface for removably attaching the strip to the keg, the instant invention employs a heat conducting adhesive on the attachment layer and for securing certain layers in the strip, such as the liquid crystal layer.

U.S. Pat. No. 5,655,839 issued to Schmidt, et al., Aug. 12, 1997 describes an IR temperature sensor that comprises a sealed housing containing an inert gas atmosphere and enclosing a detector for conversion of heat radiation into an electrical signal, an optical system which images the heat radiation emanating from an object onto the detector, a heat-conducting temperature equalization element which maintains the detector and the optical system at a common temperature, and a temperature sensor which measures the temperature of the temperature equalization element. The sealed housing protects the sensor from the external environment and maintains uniform temperature between the optical system and the sensor.

Further information concerning infrared temperature sensors is found in a brochure entitled Raynger® ST™ that describes ST30 Pro™ Standard and ST30 Pro™ Enhanced noncontact thermometers. The ST30 Pro™ Standard and ST30 Pro™ Enhanced noncontact thermometers are available from Raytek Corporation 1201 Shaffer Road Post Office Box 1820 Santa Cruz, Calif. 95061-1820.

U.S. Pat. No. 4,362,645 that issued to Hof, et al. Dec. 7, 1982 describes temperature-indicating compositions of matter. U.S. Pat. No. 4,362,645, in particular describes stable compositions of matter which change color sharply upon a transition from a liquid state to a solid state or from a solid state to a liquid state, which change of state is at substantially a predetermined temperature corresponding to a temperature to be measured.

The constituents of the Hof, et al. compositions of matter comprise: 1. a solvent (I) consisting of a single substance or a mixture of substances and adapted to change from a solid state at substantially a predetermined temperature to a liquid state and 2. an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase. Thermometers containing said stable compositions of matter are also disclosed.

U.S. Pat. No. 4,339,207 also to Hof, et al. which issued Jul. 13, 1982 describes a temperature indicating device is disclosed comprising: (a) a flat or gradually curved heat-conducting carrier having one or more cavities, each substantially filled with a composition of matter; or in the alternative, with (1) a composition of matter which changes from opaque to transparent upon a corresponding change from solid to liquid on top of an (2) indicator means located at the bottom of the cavity; said composition of matter, whether novel or not, being substantially without impurities and containing a substantially spherical void space between the bottom of the cavity; and (b) a transparent cover sheet means in sealing engagement with the heat conducting carrier means overlying and above the cavity, which spherical void space acts to magnify the color change if the novel compositions of matter are present or the presence of an indicator means upon melting of the compositions of matter in the cavity.

The compositions of matter of Hof et al., are further described as changing color sharply upon a transition from a liquid state to a solid state or from a solid state to a liquid state, which change of state is at substantially a predetermined temperature corresponding to a temperature to be measured.

U.S. Pat. No. 4,232,552 issued to Hof, et al. Nov. 11, 1980 discloses temperature-indicating compositions of matter. The Hof, et al. compositions Novel and stable compositions of matter are disclosed which change color sharply upon a transition from a liquid state to a solid state or from a solid state to a liquid state, which change of state is at substantially a predetermined temperature corresponding to a temperature to be measured. The constituents of the novel compositions of matter comprise: 1. a solvent (I) consisting of a single substance or a mixture of substances and adapted to change from a solid state at substantially a predetermined temperature to a liquid state and 2. an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase. Thermometers containing stable compositions of matter are also disclosed in U.S. Pat. No. 4,232,552.

Seiden, et al., in U.S. Pat. No. 5,426,593 issued Jun. 20, 1995 is directed to a device that measures the oxygen component of a beverage gas using a specific oxygen probe, ultrasonic degassing, a special valving technique, and microprocessor based software. The measurement is made in the gaseous state in a two-chamber system.

The device of Seiden, et al., is controlled by an electronic console that is built around a microprocessor which sequences and times the valves, receives the data from, the oxygen probe and its accompanying temperature compensation circuit, and displays the data. An alternative method is to use several chambers and one pass. Additional chambers may be used to increase the speed of the test, control interferences, or aid in identifying gases other than the oxygen component. The device may also have an interface piercing head manifold that allows carbon dioxide and oxygen to be tested in the same container and in one preparation. The invention also relates to specific gas measurements with non-specific type measurements and the general techniques can be applied to environmental problems that involve oxygen demand and respiration of bacteria.

U.S. Pat. No. 6,119,464 issued to Nakayama, et al. on Sep. 19, 2000 describes beverage servers and controlling methods for beverage servers. More particularly, Nakayama, et al. discloses a beverage server comprising a tank containing water serving as a coolant and a coiled beverage duct through which beer or other beverage flows and cooling means fitted to a portion of the wall of the tank so as to rapidly cool and serve beer or other beverage discharged from the storage container. The inner wall of the tank near the portion where the cooling means is fitted is made of a material having a high thermal conductivity, whereas the inner wall of the tank near the beverage duct is made of a material having a low thermal conductivity. A sensor is provided near the beverage duct to obtain information for controlling the cooling means. This simple beverage server assures stable serving of beverage at a suitable temperature. Another sensor is provided near a portion of the tank wall where the cooling means and a controller to controls the action of the cooling means based on the information from the sensors are also provided. The cooling means works at full capacity when one or both of the sensors have detected the melting of the coolant. This eliminates the risk of trouble due to cooling capacity deficiency even after a long interruption of cooling.

Furuhashi, et al., in U.S. Pat. No. 5,165,569 issued Nov. 24, 1992 recites a keg body for retaining draft beer substantially has adiabatic structure, in which draft beer filled in the keg body is kept cool. A part of the keg body is provided with a face which is not heat-insulated and this face is utilized as a cooling face. In case of necessity, beer is cooled from the outside through the cooling face to keep cool draft beer inside the keg body.

The reader is also directed to Hammerhead Products Accu-Level propane tank gauge. Hammerhead Products is located at 1720-22 Street Santa Monica, Calif. 90404.

U.S. Pat. No. 4,275,121 Crounse, et al., issued discloses Jun. 23, 1981 various leuco dye color formers including mono-, bis- and tris-indolyl-substituted furanones that are prepared respectively by: the interaction of an indole with mucochloric acid; the interaction of an indole with a 4-mono (indolyl)-substituted 4-oxo-2-butenoic acid; and by the interaction of an indole with a 2,4-bis(indolyl)-substituted 4-oxobutanoic acid or with a 3,5-bis(indolyl)-substituted furanone. See also U.S. Pat. No. 4,075,224; Crounse, et al., issued Feb. 21, 1978; U.S. Pat. No. 4,377,698 Crounse et al. issued Mar. 22, 1983; U.S. Pat. No. 4,451,657 Crounse, et al issued May 29, 1984; and U.S. Pat. No. 4,477,676 Crounse et al., leuco dyes issued Oct. 16, 1984.

U.S. Pat. No. 6,248,692 to Sano, et al. issued Jun. 19, 2001 discloses an erasable image forming material includes a color former, a developer, and a decolorizer and is erasable by contact with an erase solvent. Free energy alpha required for the decolorizer and the developer to form a complex and free energy .beta. required for the color former and the developer to form a complex have a relationship represented by .alpha . . . Itoreq . . . beta . . . Itoreq. 10 Kcal/mol (wherein . . . Itoreq . . . means less than or equal to).

U.S. Pat. No. 6,350,431 issued to Snow, et al. Feb. 26, 2002 discloses a physiologically tolerable light imaging contrast agent compound having a molecular weight in the range 500 to 5000000 and containing at least two chromophores having delocalized electron systems as well as at least one polyalkylene oxide (PAO) moiety having a molecular weight in the range 60 to 100000.

Tamura in U.S. Pat. No. 6,382,125 issued material May 7, 2002 recites a temperature control material comprising a temperature indicator whose developed color density differs according to temperature, which is irreversible at environmental temperature, which changes its color according to crystal or non-crystal, or phase separation or non-phase separation, and whose glass transition temperature is set to a temperature higher than control temperature, by irradiating the temperature indicator with light having a wavelength absorbed by a color developed by the temperature indicator and detecting the intensity of the reflected light or transmitted light. Accordingly, even when the temperature becomes higher than control temperature temporarily, temperature control can be carried out smoothly thereafter.

U.S. Pat. No. 6,479,293 which issued Tamura, et al., Nov. 12, 2002 discloses a temperature indicating material is prepared by incorporating, in a rewritable base system which comprises an electron donating compound, an electron accepting compound and a reversal material and undergoes color changes with temperature and time, a thermochromism controller which changes a rate of crystal to amorphous or phase-separation to non-phase-separation rate. Upon color changes with an environmental temperature, the thermochromism controller undergoes crystallization or phase separation to have a function as a place for reaction and contributes to the color changes of the temperature indicating material. The incorporation of the thermochromism controller therefore makes it possible to impart the resulting temperature indicating material with improved sensitivity to temperature at around an environmental temperature and a high S/N ratio.

To the extent that the foregoing patents are relevant to the present invention they are herein incorporated by reference. Temperatures herein are given in degrees Fahrenheit and pressures are in gauge Kpa usnlees otherwise indicated. Ratios and ranges may be combined.

SUMMARY OF THE INVENTION

The present invention describes a method for determining the level of fluid in a container comprising obtaining a container having an outlet for a first fluid and an inlet for a second fluid;

said container having a first fluid region therein;

a first fluid being present at an original level in said first fluid region of said container;

said container, for when in use, having said first fluid at least partially removed from said container thereby forming a second fluid region;

placing on at least one exterior surface of said container at least one temperature-measuring device;

at least one said temperature-measuring device being located in a region of said container where said second fluid region is formed by removal of said first fluid;

initially observing a first temperature in said first fluid region of said container when said first fluid is present in said first fluid region of said container;

subsequently observing a second temperature in said second fluid region of said container after a portion of said first fluid has been removed;

correlating the difference between said first temperature and said second temperature to the level of said first fluid in said container; and, provided further that the temperature measuring device is based on a member selected form the group consisting of a leuco dye, a clearing point liquid crystal, cholesteric liquid crystal, chiralnematic liquid crystal, and mixtures thereof.

Another aspect of the invention is a fluid dispensing assembly comprising:

a sealed container, for when in use, containing a liquid under pressure;

said sealed container having an exterior surface;

said sealed container having input means for maintaining a constant pressure within sealed container said exterior surface of said sealed container having a heightwise dimension and a widthwise dimension;

at least one temperature-measuring device positioned heightwise dimension on said exterior surface, provided further that said temperature-measuring device measures temperatures in the range of about from 45° F. to 80° F.; and, provided further that the temperature measuring device is based on a member selected form the group consisting of a leuco dye, a clearing point liquid crystal, cholesteric liquid crystal, chiralnematic liquid crystal, and mixtures thereof.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a partial cross-sectional perspective view showing a first embodiment of a beer keg of the invention;

FIG. 2 is a longitudinally cross-sectional view showing a beer keg having draft beer in the beer keg;

FIG. 3 is a view showing a beer keg;

FIG. 4 is a longitudinally cross-sectional view showing a beer keg having draft beer in the beer keg;

FIG. 5 is a view showing a thermometric measuring device;

FIG. 6 is a view showing a thermometric measuring device; and.

DETAILED DESCRIPTION OF THE INVENTION

Figure 6:
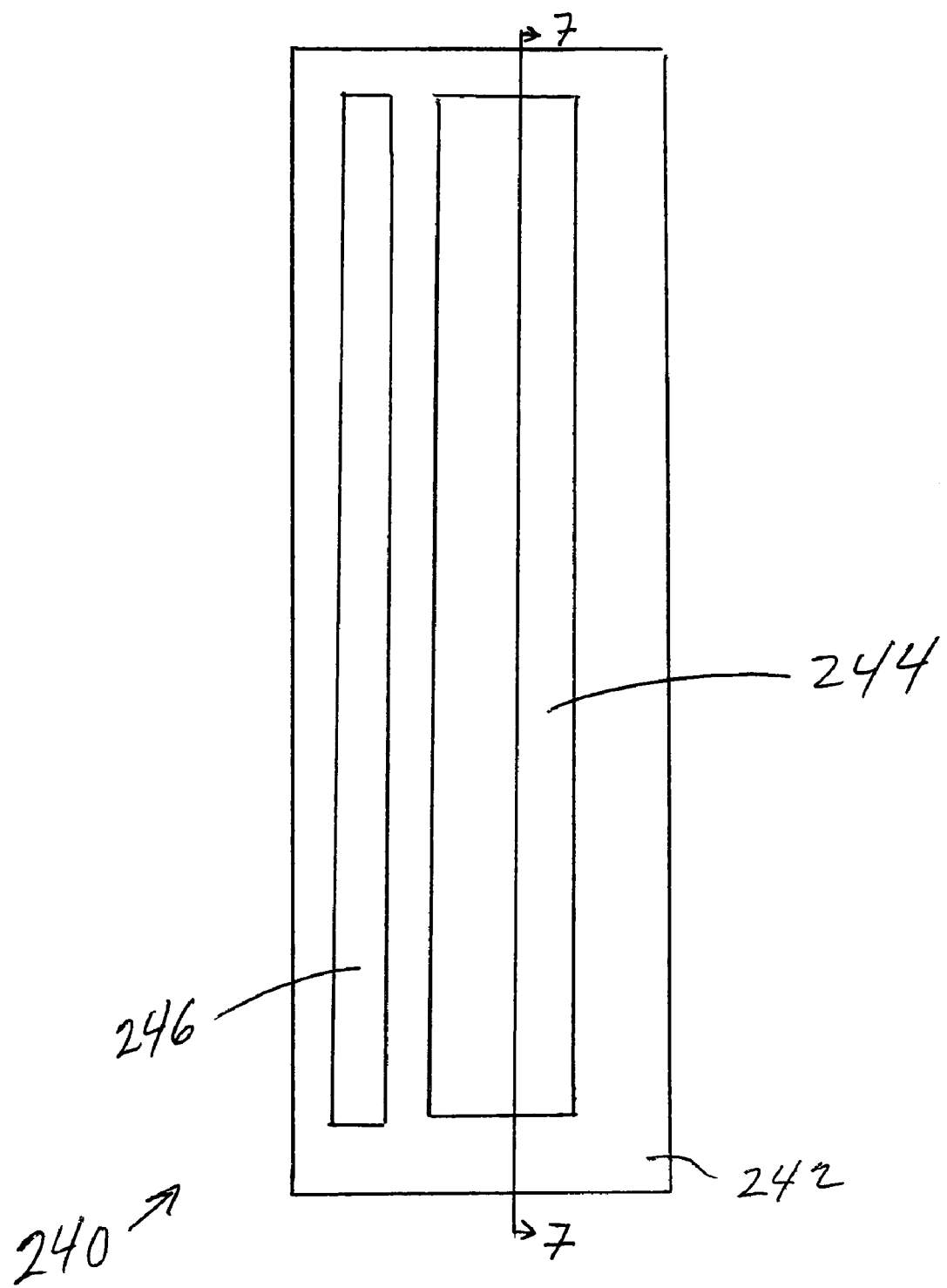
Figure 7:
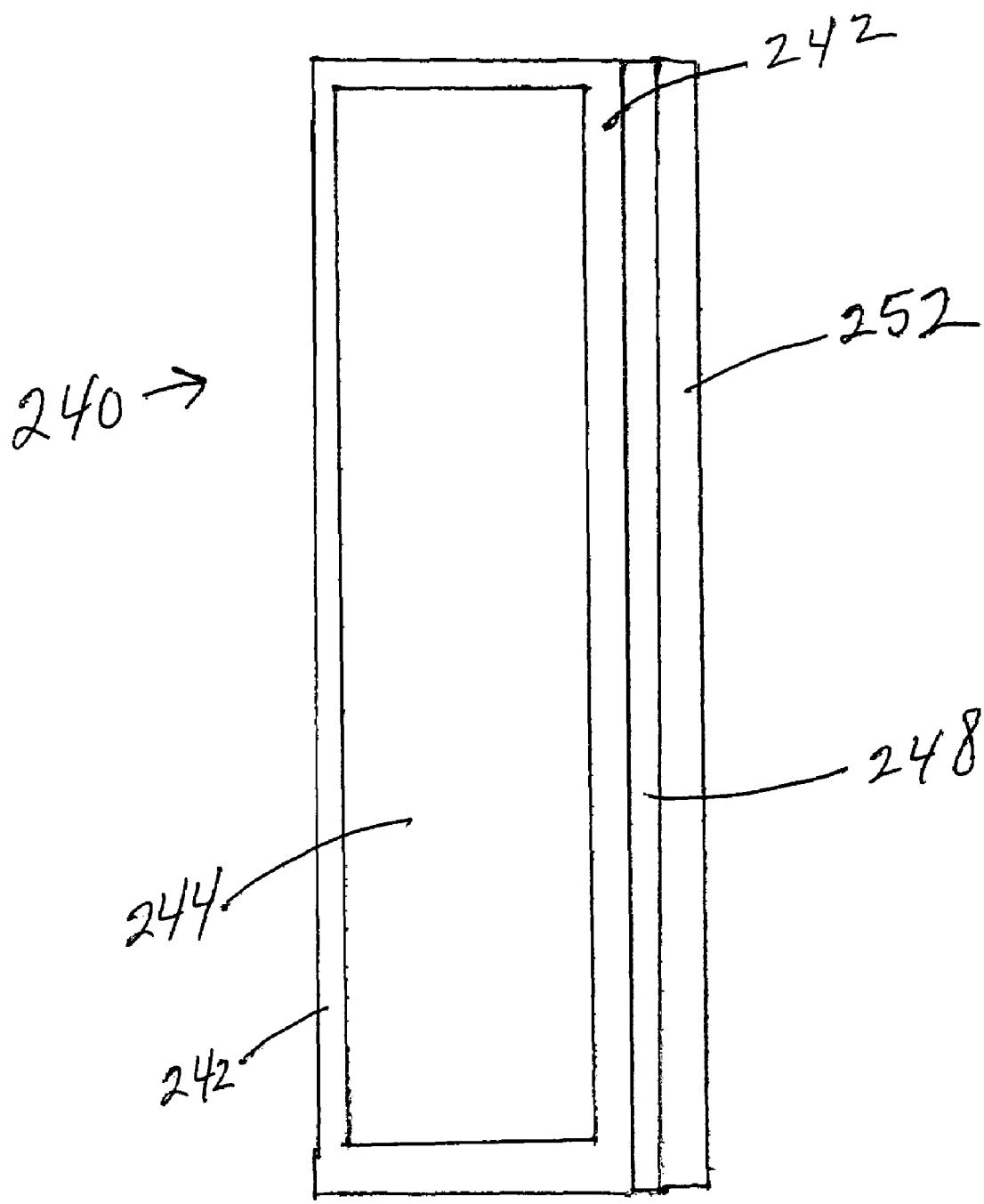
FIG. 7 is a longitudinally cross-sectional view taken along lines 7-7 of FIG. 6.

In FIG. 1, a beer keg 1 according to a first embodiment of the invention is shown. The beer keg 1 is generally cylindrical.

As shown in FIG. 2, the beer keg 1 is a container made of thin stainless steel plate, and having a mouthpiece 2 and a bottom. The beer keg 1 is prepared by welding an inner cylinder upper plate 3, the outer cylinder shell 6, and an outer cylinder lower plate 9.

The outer cylinder shell 6 is in a cylindrical form and is integrally sealed, at its upper and lower edges with the inner cylinder plate 3 and the outer cylinder plate 9, respectively, by TIG welding. In this embodiment, the mouth piece 2 is mounted on the center of the inner cylinder plate 3. A down tube 13 shown in FIG. 3 is inserted into the beer keg 1 through the mouth piece 2.

The down tube 13 is a tube for providing draft beer into the inside of the beer keg 1 and also ejecting draft beer from the beer keg 1. The down tube 13 has a carbon dioxide-valve (not shown) and a beer valve (not shown) and is screwed in the mouthpiece to be fixed.

The keg outer cylinder 6 is formed of an outer cylinder shell 8 and an outer cylinder lower plate 9. The outer cylinder shell 8 has an upper grip 7 at its upper opening edge and a keg leg 10 at its lower opening edge, respectively. Both upper and lower edges are bent inwardly. The diameter of the upper edge is slightly smaller than that of the lower edge, but the upper and lower portions of the outer cylinder shell 8 may be reversible upside down.

At the proper standing posture of the outer-cylinder shell 8, the upper edge acts as the upper grip 7 and the lower edge operates as the keg leg 10. At the inverted posture thereof, the upper edge acts as the keg leg 10 and the lower edge acts as the upper grip 7.

As shown in FIG. 1, a plurality of thermometric measuring devices 12 are provided on the outer cylinder shell 8. The thermometric measuring devices 12 are designated as 12A, 12B, 12C, and 12D. The thermometric measuring devices 12 are so designated by the appended letter to show the location on the keg outer cylinder 6.

The present invention utilizes leuco dyes to indicate temperature changes from which a determination of the liquid volume in a beer keg may be made.

A preferred group of leuco dye materials for use in the temperature-measuring strips of the present invention include certain 3-Z-4-$Z_1$-5-$Z_2$-5-(1-R-2-$R_1$-5/6-Y-3-indolyl)-2(5H)-furanones which are final products useful as colorless precursors in carbonless duplicating systems. Wherein the corresponding structural formulas are incorporated into the specification and claims by reference from U.S. Pat. No. 4,075,224; Crounse, et al., issued Feb. 21, 1978.

In a second aspect, certain 3,5-bis(1-R-2-$R_1$-5/6-Y-3-indolyl)-2-(3H)-furanones which, in addition to having the same utility as the final products, is useful as intermediates for the preparation of other final products of the invention.

In a third aspect, certain 2,4-bis(1-R-2-$R_1$-5/6-Y-3-indolyl)-4-oxobutanoic acids which are useful as intermediates for the preparation of the final products of the invention.

In a fourth aspect, certain 4-(1-R-2-$R_1$-5/6-Y-3-indolyl)-2,3-dichloro-4-oxo-2-butenoic acids which are useful as intermediates for the preparation of the final products of the invention.

Examples of the color former used in the present invention are electron-donating organic substances such as leucoauramine, diarylphthalide, polyarylcarbinole, acylauramine, arylauramine, Rhodamine B lactam, indoline, spiropyran, and fluoran. Practical examples are Crystal Violet lactone (CVL), Malachite Green lactone, 2-anilino-6-(N-cyclohexyl-N-methylamino)-3-methylfluoran, 2-anilino-3-methyl-6-(N-methyl-N-propyl-amino)fluoran, 3-[4-(4-phenylaminophenyl)aminophenyl]-amino-6-methyl-7-chlorofluoran, 2-anilino-6-(N-methyl-N-isobutylamino)-3-methylfluoran, 2-anilino-6-(dibutyl-amino)-3-methylfluoran, 3-chloro-6-(cyclohexylamino)-fluoran, 2-chloro-6-(diethylamino)fluoran, 7-(N,N-dibenzylamino)-3-(N,N-diethylamino)fluoran, 3,6-bis(diethylamino)fluoran, gamma-(4'-nitroanilino)lactam, 3-diethylaminobenzo[a]-fluoran, 3-dietylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azapht halide, 3-(4-diethylaminophenyl)-3-(1-ethyl-2-methylindole-3-yl) phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benzo-6-diethyaminofluoran, 3,6-di-p-toluidino-4,5-dimetylfluoran, phenylhydrazide-gamma-lactam, and 3-amino-5-methylfluoran. These color former compounds can be used singly or in the form of a mixture of two or more species. If color formers are selected properly, a variety of colored states can be obtained, and thus formation of multicolor image can be attained.

Examples of the developer are acidic compounds such as phenols, metal phenolates, metal carboxylates, benzophenones, sulfonic acids, sulfonates, phosphoric acids, metal phosphates, acidic phosphoric esters, acidic phosphoric ester metal salts, phosphorous acids, and metal phosphites. Practical examples are gallic acid; gallate such as methyl gallates, ethyl gallate, n-propyl gallate, i-propyl gallate, and butyl gallate; dihydroxybenzoic acids and their esters such as 2,3-dihydroxybenzoic acid and 3,5-dihydroxybenzoic acid methyl; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis [(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4''-ethylidenetrisphenol, 4,4'-(1-methylethylidene)bisphenol, and methylenetris-p-cresol. These compounds can be used singly or in the form of a mixture of two or more species.

The decolorizer used in the present invention can be a low-molecular organic material such as a sterol compound or cyclic sugar alcohol or its derivative, and can also be a polymer decolorizer. This decolorizer can be contained in either the image forming material or an erase solvent.

Examples of the decolorizer are sterol compounds such as animal sterins, plant sterins, and fungi sterins. Examples of the animal sterins are cholesterol, lanosterol, lanostadial, agnosterol, cholestanol, coprostanol, ostreasterol, actiniasterol, spongosterol, and clionasterol. Examples of bile acid are cholanoic acid, cholic acid, hyodeoxycholic acid, and lithocholic acid. Examples of the plant sterins are stigmasterol, .alpha.-sitosterol, .beta.-sitosterol, .gamma.-sitosterol, brassicasterol, and vitamin D. An example of the fungi sterins is ergosterol. One or more types of these compounds can be used. A material, e.g., lanolin alcohol, which is originally a mixture is also usable.

Other examples of the decolorizer are cholic acid, lithocholic acid, testosterone, cortisone, and their derivatives, each having very high compatibility with the developer. Practical examples are cholic acid, methylester cholate, sodium cholate, lithocholic acid, methylester lithocholate, sodium lithocholate, hyodeoxycholic acid, methylester hyodeoxycholate, testosterone, methyltestosterone, 11 alpha.-hydroxymethyltestosterone, hydrocortisone, cholesterolmethylcarbonate, and alpha.-cholestanol. Of these compounds, a compound having two or more hydroxyl groups is preferable.

The polyalkylene oxide PAO moiety can be linear or branched and is preferably a homopolymeric or copolymeric, especially block copolymeric, moiety containing repeat units $C_nH_{2n}O$ where n is 2,3 or 4, preferably 2 or 3, especially preferably $CH_2CH_2O$, $OCHCH_3CH_2$, $CH_3CHCH_2O$ or $CH_2CH_2CH_2O$ repeat units. Within the PAO moiety, one or more, preferably one or two, of the ether oxygens may be replaced by an amine group NH or NE where E is a bond or an alkyl or hydroxyalkyl group or a $(C_nH_{2n}O)_qE'$ side chain (where n is 2,3 or 4 and q is an integer, the maximum value for which is set by the molecular weight limit for the PAO and E' is H or alkyl, a chemical bond or a chromophore).

The compounds of the invention preferably have a polymer structure with repeat units containing both a chromophore and a polyalkylene oxide moiety. At the lower limit of such a polymer structure, the compounds may simply contain two chromophores and a polyalkylene oxide moiety. The compounds of the invention may thus be of or contain a moiety of formula I

Chr-L[PAO-L-Chr]$_n$           (I)

where each Chr which may be the same or different is a chromophore, each PAO which may be the same or different is a polyalkylene oxide moiety, each L is a bond or organic linking group connecting at least one PAO to at least one Chr, and n is an integer having a value of at least 1 (the upper limit for n being determined by the molecular weight limit for the compounds of the invention).

As used herein, the term "linking group" is a chemical moiety that connects together at least two molecules, at least the residue of one molecule with another molecule, or at least the residue of one molecule with the residue of another molecule. The unit [PAO-L-Chr] will allow for the polymer to be branched or alternatively to be linear. Examples of such structures include: ##STR1## as shown in U.S. Pat. No. 6,350,431 issued to Snow, et al. Feb. 26, 2002 where L' and L'' are bonds or linker groups as mentioned above. Thus, when [PAO-L-Chr] is a repeat unit in a polymer, the PAO and Chr moieties may form part of or may be pendant from the polymer backbone. Similarly the repeat unit [PAO-L-Chr] may contain more than one chromophore or more than one PAO moiety.

Alternatively the compounds of the invention may comprise a branched polymer, such as a dendrimer or cascade polymer, with PAO and Chr moieties attached to polymer termini. As used herein, a branched polymer is a polyalkylene oxide moiety that contains at least one branching group to which is attached at least one additional polyalkylene oxide group.

In one aspect, a branching group in the backbone of the polyalkylene oxide moiety can be selected from the group consisting of a nitrogen atom and a carbon atom. At least one additional polyalkylene oxidyl group can be attached to the branching group by a chemical bond selected from the group consisting of carbon-carbon, carbon-nitrogen, and carbon-oxygen chemical bonds, or by a linking group.

Preferred linking groups to a nitrogen branching group include:

methylene groups, [—$CH_2$—];

poly(methylene) groups, [—$(CH_2)_n$—] wherein n is an integer from 2 to about 16, such as can be formed by reaction between a nitrogen NH group and an alkylenyl group containing a terminal halide (e.g., Cl, Br, I) or sulfonate group (e.g., methanesulfonate, toluenesulfonate, benzenesulfonate and the like);

alkylenecarbonyl groups [—$(CH_2)_{n''}$—C(=O)—] wherein n'' is an integer from 1 to about 16 such as can be formed by reacting an NH group with a haloalkylenecarbonyl group;

ethylenesulfonylethylene groups [—$CH_2CH_2$—S(=O)$_2$—$CH_2CH_2$—], such as can be formed by reacting an NH group with a vinylsulfonylethylene group [$CH_2$=CH—S(=O)$_2$—$CH_2CH_2$—];

ethylenesulfonylmethyleneoxymethylenesulfonylethylene groups [—$CH_2CH_2$—S(=O)$_2$—$CH_2$—O—$CH_2$—S(=O)$_2$—$CH_2CH_2$—], such as can be formed by reacting an NH group with a vinylsulfonylmethyleneoxymethylenesulfonylethylene group [$CH_2$=CH—S(=O)$_2$—$CH_2$—O—$CH_2$—S(=O)$_2$—$CH_2CH_2$—];

ethylenesulfonylmethylenesulfonylethylene groups [—$CH_2CH_2$—S(=O)$_2$—$CH_2$—S(=O)$_2$—$CH_2CH_2$—], such as can be formed by reacting an NH branching group with a vinylsulfonylmethylenesulfonylethylene group [$CH_2$=CH—S(=O)$_2$—$CH_2$—S(=O)$_2$—$CH_2CH_2$—];

carbonyl groups [—(C=O)—] which can comprise an amide linking group formed, for example, by reacting an NH branching group with an activated ester such an N-hydroxysuccinimidyl-ester, or with a mixed anhydride such as a trifluoromethyloxycarbonyl-, or with an acid halide such as an acid chloride, e.g., Cl—(C=O).)—;

sulfonyl groups [—S(=O)$_2$—] which can comprise a sulfonamide linking group formed, for example, by reacting an NH branching group with a sulfonyl halide such as a polyalkylene oxidylalkylenesulfonyl chloride, e.g., Cl—S(=O)$_2$—$(CH_2)_n$—O-PAO;

wherein n is an integer from 2 to about 16 and PAO is a polyalkylene oxidyl group;

carbonyloxy groups [—C(=O)—O—] such as those found in urethane groups such as can be obtained by reacting a polyalkyleneoxy group with phosgene and then with an NH group; thiocarbonyl groups [—(C=S)—] such as those found in thiourethane groups such as can be obtained by reacting a polyalkyleneoxy group with thiophosgene and then with an NH group; alkylenecarbonyloxymethyleneoxycarbonylalkylene groups [—(—$CH_2$—)$_n'$—C(=O)—O—C(R'R'')—O—C(=O)—(—$CH_2$—)$_n'$—] where each n' is independently selected from the group of integers from 1 to 16 and each R' and R'' is independently selected from the group consisting of H and methyl; and, carbonylalkylenecarbonyl groups [—C(=O)—$(CH_2)_w$—C(=O)—] wherein w is an integer from 1 to about 6, such as succinate and adipate.

Preferred linking groups to a carbon branching group include:
ether groups [—O—];
thioether groups [—S—];
thiosulfoxide groups [—S(=O)—];
thiosulfonyl groups [—S(=O)$_2$—];
oxycarbonyl groups [—O—C(=O)—];
aminocarbonyl groups [—NH—C(=O)—];
carbonyl groups [—(C=O)—];
carbonyloxy groups [—C(=O)—O—];
carbonate groups [—O—C(=O)—O—];
carbonyloxymethyleneoxycarbonylalkylene groups [—(—C(=O)—O—C(R'R'')—O—C(=O)—(—$CH_2$—)$_n'$—]

where n' is an integer from 1 to 16 and each R' and R'' is independently selected from the group consisting of H and methyl;
urethane groups [—O—C(=O)—NH—]; and
thiourethane groups [—O—(C=S)—NH—].

In another aspect, a branching group can comprise the unit —$NR_1'$—$CR_2'R_3'$—$CR_4'R_5'$— wherein $R_1'$ can be selected from the group consisting of H, an alkyl group of from 1 to about 16 carbon atoms which may be linear, branched, saturated, unsaturated, or contain a carbocyclic ring of from 3 to about 10 carbon atoms, or a carbonylalkyl group wherein the alkyl group is defined immediately above; $R_2'$ and $R_3'$, are independently selected from the group consisting of H, an alkylene group of from 1 to about 16 carbon atoms, which may be linear, branched, saturated or unsaturated, and can contain a carbocyclic ring of from 3 to about 10 carbon atoms and to which is attached a polyalkylene oxidyl group through a heteroatom group selected from the group consisting of NH, O, S, O—C(=O), and C(=O)—O, e.g., such as 4-(polyalkyleneoxyethylcarbonylaminobutyl), [PAO—$CH_2CH_2$C(=O)NH—$(CH_2)_3$—], 2-(polyalkyleneoxycarbonyl)ethyl, [PAO—C(=O)$CH_2CH_2$—], polyalkyleneoxycarbonylmethyl, [PAO—C(=O)$CH_2$—], polyalkyleneoxyethylaminocarbonylmethyl, [PAO—$CH_2CH_2$NHC(=O)$CH_2$—], polyalkyleneoxyethylaminocarbonylethyl, [PAO—$CH_2CH_2$NHC(=O)$CH_2CH_2$—], polyalkyleneoxymethyl, [C], and polyalkyleneoxyethylthiomethyl, [PAO—$CH_2CH_2$—S—$CH_2$—];

$R_3'$ and $R_5'$ are independently selected from the group consisting of H, an alkyl group of from 1 to about 16 carbon atoms which may be linear, branched, saturated, unsaturated, or contain a carbocyclic ring of from 3 to about 10 carbon atoms, or a carbonylalkyl group wherein the alkyl group is defined above, or, preferably, where both $R_3'$ and $R_5'$ are taken together form a carbonyl group; and wherein at least one of $R_2'$ $R_3'$ is not H.

Preferred units —$NR_{11}'$—$CR_2'R_3'$—$CR_3'R_5'$— are selected from the group consisting of lysine, aspartic acid, glutamic acid, cysteine, and serine in the backbone of the polyalkylene oxide moiety and contain least one additional polyalkylene oxide attached, for example, to the epsilon amine site of lysine, to the gamma carboxylic acid site of aspartic acid, to the delta carboxylic acid site of glutamic acid, to the beta sulfhydryl group in cysteine, and to the beta hydroxy site of serine.

In another aspect, one branching group and a carbon atom in the backbone of the polyalkylene oxide moiety or two branching groups in the backbone of the polyalkylene oxide moiety can be joined by an alkylene group of from 2 to 12 carbon atoms. The alkylene group can be linear or branched such as ethylene, propylene, butylene, isobutylene, pentylene, hexylene, octylene, decylene, and dodecylene. The alkylene group can be saturated or unsaturated such as 2-butenylidene, isoprenylene, and 2-butynylidene. In another aspect, the alkylene group can comprise a saturated or unsaturated cyclic group such as cyclopropylidene, cyclobutylidene, 1,2-cyclopentylidene, 1,3-cyclopentylidene, 1,2-cyclohexylidene, 1,3-cyclohexylidene, 1,4-cyclohexylidene, a cyclohexenylidene ring such as can be formed by a Diels-Alder reaction between a diene and a dieneophile, 1,4-cycloheylidenebismethylene, ethylene-1,2-cyclopropylidenernethylene, 1,1-spirocycloproylidenebismethylene, and the like, and which can contain an oxygen or sulfur ether atom, such as a 2,5-tetrahydrofuranylene group and a 2,6-tetrahydropyranylene group.

In another aspect, one branching group and a carbon atom in the backbone of the polyalkylene oxide moiety or two branching groups in the backbone of the polyalkylene oxide moiety can be separated by an aromatic ring of 6 to 14 carbon atoms such as p-phenylene, or m-phenylene, or m-toluidene, 9,10-anthracenylidene, or 1,4-naphthalenylidene, or an aralkylene group such as p-phenylenebismethylene, or 9,10-anthracenylidenebismethylene, and which aromatic ring can comprise a 5- or 6-membered heterocyclylene group containing one or two heteroatoms selected from the group consisting of nitrogen, oxygen, and sulfur such a 2,6-pyridinylene, 1,4-imidazolidene, 5,8-quinolinylidene, and 1,1-spiro-2,6-dithiacyclohexylene, or a symmetrical triazinylene group.

In this event, the compound will have the formula II

$$L'''(Chr)_m(PAO).sub_p \qquad (II)$$

where L''' is a branched polymer with Chr and PAO groups attached, m is an integer having a value of at least two, and p is an integer having a value of at least one (the maximum values of m and p being determined by the number of terminal attachment sites on L''').

In general, it is preferred that the compounds should contain Chr and PAO groups in a ratio which is greater than 1:1 in favor of the chromophore.

The compounds of formula III

$$Chr[L^*-PAO-L^*-Chr]_n \qquad (III)$$

(where Chr, PAO and n are as defined above, and each L* is a bond or an organic linker moiety) are especially preferred. Such compounds contain one more Chr moiety than PAO moiety.

The compounds of formula IV##STR2## wherein the corresponding structural formulas are incorporated herein by reference U.S. Pat. No. 6,350,431 issued to Snow, et al. Feb. 26, 2002, and are more especially preferred wherein each $L_1$ is a group independently selected from the group consisting of an organic linker moiety and a chemical bond; each X is independently selected from the group consisting of O, N—$R_1$, S, Se, Te, CH=CH and $(CH_3)_2C$; each $R_1$ is independently selected from the group consisting of a methyl group, an ethyl group, and a $C_{3-16}$ alkyl group optionally containing one or more heteroatoms selected from the group consisting of O, N, and S, which heteroatoms are separated from one another by at least 2 carbon atoms, and which ethyl and alkyl groups optionally contain one or more hydrophilic functional groups selected from the group consisting of hydroxyl groups, carboxyl groups, sulfonate groups, sulfate groups, phosphate groups, phosphonate groups, amino groups, amino acid groups; examples of hydrophilic groups on $R_1$ groups include $C_{5-10}$ carbohydrate groups, carboxylate groups and $C_{2-10}$ oxycarbonylalkyl groups, dihydroxypropyl groups, and the like; each Z, of which there is at least one, is independently selected from the group consisting of H, a methyl group, an ethyl group as defined above, a $C_{3-16}$ alkyl group as defined above, a $C_{1-16}$ alkoxyl group, the alkyl portion of which is as defined above, a $C_{1-16}$ carboxyalkyl group, a $C_1$-16 oxycarbonylalkyl group, a sulfonate group, a hydroxyl group, a phosphate group, a $C_{1-16}$ sulfonamidoalkyl group, a phenyl-$C_{1-16}$-alkyl group, a phenoxy-$C_{1-16}$-alkyl group, a $C_{1-16}$ phenyloxyalkyl group, an oxyphenoxy-$C_{1-16}$-alkyl group, the alkyl portions each of which are as defined above, or an annulated aromatic ring which comprises a benz[e]aromatic ring, a benzoaromatic ring, or a benzoaromatic ring, where e, f, and g are defined relative to the indole structure as a template and each of which may be substituted by $C_{1-16}$ alkyl, $C_{1-16}$ alkoxyl, carboxyl, sulfonate, sulfonamido, phenyl, or phenoxyl groups as defined above; each $R_2$ is independently selected from the group consisting of H, $C_{1-16}$ alkyl as defined above, or two $R_2$ groups together with the three intervening carbons form a 5 or 6 membered carbocyclic ring optionally containing a ring heteroatom selected from the group consisting of O, N—$R_1$ and S; m is an integer up to 1200, preferably from 5 to 1200, more preferably from 50 to 1000; and each p independently is 0 or 1 when $L_1$ is an organic linker moiety.

Further materials that may be employed herein are electron donor color developing compounds such as phenyl methane-based compounds (such as fluoranes and phenyl phthalides), indolyl phthalides, spiropiranes, leuco auramines, acyl or aryl auramines and the like.

Electron acceptor compound (developers) compounds having a phenolic hydroxyl group, metal salts of compounds having a phenolic hydroxyl group, triazoles, carboxylic acids, metal salts of carboxylic acids and the like.

Steroid-based materials whose glass transition temperature is higher than measurement environmental temperature when they are prepared in the form of final ink can be used. For example, pregnenolone and methylandrostenediol can be used. A styrene resin, styrene-methacrylic acid copolymer, ethylene-vinyl acetate copolymer, acrylic resin and the like can be used.

The glass transition temperature (Tgc) of the resin is set to a temperature higher than the glass transition temperature (Tgr) of a temperature indicator comprising an electron acceptor compound, electron donor compound and reversible material.

Stated specifically, a styrene-methacrylic acid copolymer (A-91: Dainippon Ink and Chemicals, Inc., 10% of methacrylic acid, Tgc: 126° C.) is used as a binder resin, crystal violet lactone (CVL) is used as a leuco dye, propyl gallate (PG) is used as a developer, and pregnenolone (PRN) is used as a reversible material to prepare ink.

Leuco dyes include A for black color, the following ones can be used (not limited thereto): PSD-150, PSD-184, PSD-300, PSD-802 and PSD-290 (each, trade name; product of Nippon Soda Co., Ltd.) CP-101, BLACK-15 and ODB (each, trade name; product of Yamamoto Chemicals, Inc.). BLACK-500 (trade name; product of Yamada Chemical Co., Ltd.). TH-107 (trade name; product of Hodogaya Chemical Co., Ltd.)

As the leuco dye A for blue color, the following ones are usable (not limited thereto). CL and BLMB (each, trade name; product of Nippon Soda Co., Ltd.), BLUE-63 and BLUE-502 (each, trade name; product of Yamamoto Chemicals, Inc.), BLUE-220 (trade name; product of Yamada Chemical Co., Ltd.) and BLUE-3 (trade name; product of Hodogaya Chemical Co., Ltd.).

As the leuco dye A for bluish green color, the following ones are usable (not limited thereto). GN-169, GN-2 and Green-40 (each, trade name; product of Yamamoto Chemicals, Inc.). Green-300 and Green-46 (each, trade name; product of Yamada Chemical Co., Ltd.) The dyes may be used either singly or in combination.

As an example of the developer B that acts as an electron accepting compound in the present examples, PG was mentioned. The developer B is not limited thereto but usable examples include oxides of a phenol, a metal salt of a phenol, a metal salt of carboxylic acid, sulfonic acid, a sulfonate, phosphoric acid, a metal salt of phosphoric acid, an acid phosphate ester, a metal salt of an acid phosphate ester, a phosphite or a metal salt of phosphorous acid.

Specific examples include 2,4-dihydroxyacetophenone (2,4-HAP), 2,5-HAP, 2,6-HAP, 3,5-HAP, 2,3,4-HAP, 2,4-dhydroxybenzophenone (2,4-HBP), 4,4'-HBP, 2,3,4-HBP, 2,4,4'-HBP, 2,2',4,4'-HBP, 2,3-dihydrobenzoicacid, methyl 3,5-dihydrobenzoate, 4,4'-biphenol and 2,3,4,4'-tetrahydroxybenzophenone.

The electron accepting compound largely affects the color development rate. Described specifically, the time from the separation of the electron accepting compound from the reversal material and thermochromism controller to the association with the electron donating compound and color development can be changed largely by the nature of the electron accepting compound. Temperature characteristics can be changed by selecting its material. A binder resin is selected according to the desired temperature characteristics. Examples of the binder resin include ethylene copolymers such as polyethylene, chlorinated polyethylene, ethylene-vinyl acetate copolymer and ethylene-acrylic acid-maleic anhydride copolymer, polybutadienes, polyesters such as polyethylene terephthalate, polybutylene terephthalate and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluorine resins, acrylic resins, methacrylic resins, acrylonitrile copolymers, styrenecopolymers such as polystyrene, halogenated polystyrene and styrene methacrylic acid copolymer, acetal resins, polyamides such as nylon 66, polycarbonates, cellulose resins, phenol resins, urea resins, epoxy resins, polyurethane resins, diaryl phthalate resins, silicone resins, polyimide amides, polyether sulfones, polymethyl pentenes, polyether imides, polyvinyl carbazoles and amorphous polyolefin. These resins may be used either singly or in combination.

In these examples, PET is used as a base material, but the base material is not limited thereto. In this example, the temperature monitoring material is in the form of a label, but it can be used in the form of a thermal transfer ink ribbon or in the form of a thermosensible paper having, thereon, a temperature indicating material and a diffusion layer therefore.

The temperature monitoring strip becomes sensitive to a predetermined temperature and has improved reflectance upon decolorization and therefore has an improved S/N ratio by using a temperature indicating material which has been obtained by adding to a mixture of an electron donating compound A, an electron accepting compound B and a reversal material C, a cycloalkanol or cycloalkane diol as a thermochromism controller D and by employing as the electron accepting compound B that permitting complete dissolution of it in molten cycloalkanol or cycloalkane diol.

As described above, the temperature indicating material according to the present invention is obtained by incorporating, in a rewritable base system which is composed of an electron donating compound, an electron accepting compound and a reversal material and undergoes color changes with time and temperature, a thermochromism controller for changing a rate of crystal to amorphous or phase separation to non phase separation. When the temperature indicating material undergoes color changes at an environmental temperature, the thermochromism controller provides a place for reaction after crystallization or phase separation, thereby contributing to the color change of the temperature indicating material. This makes it possible to improve the reflectance upon decolorization and in addition, owing to the place for reaction provided after phase separation, an area sensitive to the thermochromic characteristics appears, leading to an improvement an S/N ratio. The place for reaction upon decolorization due to an environmental temperature can be provided easily by the use of a cyclododecanol or cyclododecanediol as the therochromism controller.

The temperature monitoring device is prepared by using a temperature indicating material which contains an electron donating compound, an electron accepting compound and a reversal material, is initialized at the starting time of temperature monitoring and undergoes color changes with temperature and time and by printing or coating information to a base material. By incorporating, in the temperature indicating member, a cycloalkanol or cycloalkane diol which exhibits stable crystalline condition within a temperature monitoring range, the resulting temperature monitoring device becomes sensitive to temperature, which makes it possible to determine an environmental temperature for storage, though roughly.

In addition, a reflectance upon decolorization is improved, which improves an S/N ratio when the condition upon color development is read mechanically. Even when the condition must be confirmed visually, the color development by exposure to high temperatures can be detected easily. Addition of the cycloalkanol or cycloalkane diol in an amount not less than 1 part by weight but not greater than 20 parts by weight based on 1 part by weight of the electron accepting compound makes it possible to determine the lower limit permitting the exhibition of thermochromic characteristics and moreover, makes it possible to determine the upper limit permitting the continued adhesion of an ink film of the temperature indicating material to the base material when the temperature monitoring device is formed as a label. If the dissolution of the electron accepting compound and the melting of the cycloalkanol or cycloalkane diol by heating are conducted simultaneously, reflectance upon decolorization is improved, which makes it possible to improve the S/R ratio when the color development is read mechanically. Even if the condition is visually confirmed, it becomes possible to easily detect the color development upon exposure to high temperatures and to specifically determine an environmental temperature for storage owing to the improved sensitivity to temperature.

By controlling the amount of a cycloalkanol or cycloalkane diol depending on the nature of the electron accepting compound, the temperature indicating material thus obtained has increased sensitivity to temperature and can acquire a function of specifically determining an environmental temperature for storage.

The thermometric measuring devices 12 are first located along the height of the keg outer cylinder 6 and generally correspond to a level of 10 percent of maximum fluid content of the beer keg 1, 25 percent of maximum fluid content of the beer keg 1, and 75 percent of maximum fluid content of the beer keg 1. Alternatively, thermometric measuring devices 12 are conveniently located at a point from 5% to 35% of the maximum original fluid level in said first fluid region of said container.

The thermometric measuring devices 12 are also located circumferentially around the keg outer cylinder 6. Conveniently, the thermometric measuring devices 12 located around the circumference of the keg outer cylinder 6 are two, three, four, five, six, seven, or eight in number.

The thermometric measuring devices 12 located around the circumference of the keg outer cylinder 6 are to aid in the determination of fluid level. As the beer kegs are quite heavy and when tapped with associated piping the movement of beer kegs is difficult. Also the movement of the beer kegs into a cooler of confined dimensions makes it difficult to move the kegs within a cooler. Accordingly, a plurality of thermometric measuring devices 12 makes it easier to see at least one of the thermometric measuring devices 12.

When for example, there are two of the thermometric measuring devices 12 circumferentially located on the keg outer cylinder 6 either of the two the thermometric measuring devices 12 may be read. If there are three of the thermometric measuring devices 12 circumferentially located on the keg outer cylinder 6 and each is located approximately 120 degrees apart it will be easier to see at least one of the thermometric measuring devices 12.

The thermometric measuring devices 12 are conveniently placed in as close a contact as is possible with keg outer cylinder 6. The thermometric measuring devices 12 may be adhesive backed to permit relatively intimate contact with the keg outer cylinder 6. Alternatively, the thermometric measuring devices 12 may be affixed to the keg outer cylinder 6 by means of a transparent pressure sensitive adhesive tape (not shown). The transparent pressure sensitive adhesive tape permits viewing of the thermometric measuring devices 12 to determine the temperature and accordingly the volume level of the beer keg 1.

The outer cylinder lower plate 9 is provided with a nozzle 11 having a valve. After the valve is opened and the nozzle 11 is connected to a vacuum pump (not shown) air or liquid in the beer keg 1 is removed. In this manner the beer keg 1 may be cleaned. Then, the valve is then closed to permit filling of the beer keg 1.

In a brewery, there is a line where a beer keg 1 incorporated with the down tube 13 is automatically washed and draft beer is automatically filled in the beer keg 1. Similarly, the beer keg 1 of the present invention is automatically washed and filled with draft beer by using the above-mentioned line. The beer keg 1 filled with the draft beer is stored in a refrigerator for shipping to forcibly cool beer in the beer keg 1 through the face Cz. In shipping, as shown in FIG. 3, the upper face of the inner cylinder upper plate 3 of the beer keg 1 is covered with an adiabatic mat 14 to keep low temperature. The beer keg 1 is kept in a proper standing posture, so that temperature of draft beer filled in the beer keg 1 does not substantially rise due to the fact that draft beer is heat-insulated by the vacuum layer between the beer keg 1 and the outer cylinder shell 8. After the beer keg 1 of the present invention is supplied to and stored in a tavern, beer is kept cool in a refrigerator in an inverted posture or horizontal posture. Draft beer is cooled through the face Cz of the inner cylinder upper plate 3, so that the draft beer can be effectively forcibly cooled.

In the beer keg 1 described in the present invention, the upper end hole of the outer-cylinder shell 8 is reduced in diameter to be smaller than the lower end hole, but either one of the upper and lower edges of the outer cylinder shell 8 becomes a grip or keg leg, so that the beer keg 1 can be placed without distinguishing upper and lower portions. On sale of draft beer at a tavern, beer is supplied in a conventional manner to a pitcher and so on through the down tube 13 while carbon dioxide is injected with pressure, wherein the beer keg 1 is vertically positioned to locate the mouth piece upwardly. To keep the draft beer cool during the sale is made by inserting a cooling agent a between the adiabatic mat 14 and the inner cylinder upper plate 3.

In use, as best seen in FIG. 2, is the level of beer 80 in a beer keg 1. It is observed that the beer 80 within the beer keg 1 has excellent heat flow characteristics when compared to the gas in the headspace out of the liquid level of the beer. As the beer 80 is withdrawn from the beer keg 1 through the down tube 13, increased headspace occurs. The gas in the headspace will typically be warmer than the liquid in the beer keg 1. As such a temperature-measurement in the region of that headspace will result in a higher temperature than that in the liquid.

As best seen in FIG. 3, as the beer 80 is drawn from the level of 12D to 12C the heat flow characteristics will cause the thermometric measuring device 12D to increase in temperature and to change color. The thermometric measuring device 12C will maintain its temperature and not change color until the liquid level drops to the region below thermometric measuring device 12C.

As the tavern owner will desire to know only the level of various kegs of beer it is possible to make such determination by observing where the colder temperature region of the beer keg is located. Thus, when the temperature of the beer keg 1 indicates that the colder temperature is only at the lower 10 percent of the beer keg 1 it is easily determined that the beer keg 1 should be changed prior to a busy evening. Of course, the temperature indicator on the beer keg 1 is also more than adequate to determine which are kegs are of sufficiently low temperature from which to serve the beer. The present invention also provides an opportunity for loss prevention or inventory control by tavern keeper.

In a situation where the mercury thermometer is utilized, the thermometer may be moved around on the beer keg 1. The present invention may also utilize the temperature-measuring device to determine during the course of the evening as to how far the beer has been depleted. The temperature-measuring device utilized herein may be of the liquid crystal variety. The tanks and cans with which the present invention is primarily concerned contain both a gas and a liquid phase. Therefore, beer, and carbonated soft drinks provide an excellent venue for the volume determination. Other products that may be employed include any common aerosol product such as pressurized whipped cream or a product such as a pressurized insecticide. However, it is possible to obtain readings on products in which a gas phase is formed as the product is utilized. Thus various aspects of the present invention may be utilized to determine the level in a container having therein oxygen, Freon (chlorofluorocarbons), acetylene, butane, propane, nitrogen, and the like.

As best seen in FIG. 4, is a second version of a beer keg 1 as shown in FIG. 1. In FIG. 4 there is an outlet tube 113 and a down tube 115. The outlet tube 113 is employed first to fill a liquid such as beer into the beer keg 1. Typically, a liquid such as beer will have carbon dioxide dissolved therein. The outlet tube 113 is then sealed to an airtight state. A single thermometric measuring device 120 in the form of an elongated thin strip is mounted on the side of the beer keg 1. The single thermometric measuring device 120 extends beyond the two ribs 126 and 128 on the outer cylinder shell 8 of the beer keg 1.

To prevent the beer from oxidizing, the down tube 115 has any remaining air (oxygen) drawn off by a vacuum from the beer keg 1. Thereafter, carbon dioxide may be added through the down tube 115 so that no other gas comes in contact with the surface of the beer. The down tube 115 is then sealed to an airtight state. In this manner the beer in the beer keg 1 is kept fresh and also has the correct degree of carbonation.

The beer keg 1 when tapped at a public house will have both the outlet tube 113 and the down tube 115 opened. The outlet tube 113 will then be connected to the appropriate tapped beer supply line (not shown). The down tube 115 will then be connected to a regulated carbon dioxide gas supply line (not shown). As of the beer is drawn off to the outlet tube 113 carbon dioxide is introduced through the down tube 115 to maintain the atmosphere within the beer barrel relatively free of oxygen and to provide pressure to force the beer through the outlet tube 113. The carbon dioxide also minimizes foaming within the beer keg 1. When foaming occurs in the beer keg between the beer 80 and the carbon dioxide 82 1 the interface is disrupted. The foam contains a substantial amount of liquid beer and thus false readings of volume occur, as there is no clear temperature break between the liquid beer and the carbon dioxide.

As the level of the beer in the beer keg 1 is reduced from a first beer level to beer level 80 the thermometric measuring device 120 rapidly detects the changing level of the beer because that portion of the temperature sensor on the beer barrel in the region of the gas above the beer level will be of a different color than the color where the liquid is present. The foregoing is believed to occur because the gas above the liquid surface is less able to draw in heat from the ambient region than is the liquid below the liquid surface. To aid in the temperature determination one may wipe a damp cloth or apply water from an aqueous based liquid from a spray bottle along the temperature sensor to aid in the heat transfer effect. The application of the water is at room temperature and may be conveniently utilized in a temperature range of 45° F. to 80° F., preferably from 50° F. to 60° F. The method for determining the level of said first fluid in said container according to claim 1 additionally comprising the step of wiping the temperature-measuring device with water moistened cloth wherein the temperature of the water-moistened cloth is less 90° F.

A variation, on the present invention is to utilize a pony keg or a quarter barrel of beer (effectively differing only in size from the keg 1). In this situation, the pony keg is placed in a tub of ice to maintain the beer in a cold state. In this case the down tube 115 typically utilizes air pressure that is manually pumped into the pony keg. As the pony keg will typically be emptied the relatively short period of time the presence of atmospheric oxygen does not deteriorate the flavor of the beer. The temperature strip will accurately-determine changes in the volume of the pony keg.

The thermometric measuring device 120 in the form of the strip is usually adhesive backed or magnetically backed. The adhesive backing or the magnetically backing permits easy attachment to the beer keg 1.

The products that are placed in sealed containers such as the beer keg 1, according to the present invention, are preferably intended for use at less than 100 pounds per square inch to at 70° Fahrenheit. Preferably, the products in the sealed containers according to the present invention are pressurized between 5 and 90 pounds per square inch, or preferably between 10 and 80 pounds per square inch at 70° Fahrenheit.

The thermometric measuring device 120 intended for a beer keg or relatively similarly sized pressurized container are up to 14 inches in length with a width of three-quarters of an inch. Conveniently, the temperature-measuring device for cans is about 6 inches long with a width of three-quarters of an inch. The dimensionless ratio of the width to the height is about 0.5 to about 10 to about 1 to about 5, and preferably the dimension-less ratio of the width to the height is about 0.7 to about 10 to about 1 to about 4.

The thermometric measuring device 120 is sufficiently sensitive to temperature changes, which are indicative of volume, such that an ordinary can such as whipped cream can (not shown) may have the remaining product determined by removing the whipped cream can from the refrigerator and placing it on a table for a few minutes. The color indicator of the thermometric measuring device 120 will then change with a relatively sharp line forming between the gas and liquid phases in the whipped cream can. Any can for which the temperature of the volume is desired should be maintained in an upright position and unnecessary shaking of the can avoided. Alternatively, a food product containerized in an aerosol can may be placed in the freezer compartment of a refrigerator for a few minutes and then removed. The temperature change of the single thermometric measuring device 120 in the form of an elongated thin strip is observed and the volume determined. A further method of determining the remaining product volume is to utilize the heat of the hand to slightly warm the can and then observe the color change in the single thermometric measuring device 120 in the form of an elongated thin strip.

Alternatively, as best seen in FIG. 5 is a thermometric measuring device 140. The thermometric measuring device 140 is mounted on a magnetic strip 144. As previously discussed the thermometric measuring device 140 operates by sensing a color change that indicates the volume of a container. The thermometric measuring device 140 is formed form a plurality of separate sensors 146 the first of which is labeled 148. The first sensor 148 operates at a separate temperature range. Thus, for example, the first sensor strip 148 operates to indicate a temperature change, and hence volume, at from 36° F. to 46° F., whereas the second sensor strip 148 operates from 46° F. to 56° F., and so forth. The plurality of separate sensors 146 permits the operation of the thermometric measuring device 140 to function at differing ambient temperatures without the need for artificial aids such as pouring hot water on a propane tank. Additional sensors are shown as A & B and function over differing temperature ranges.

As shown in FIG. 6 is a thermometric measuring device 240. The thermometric measuring device 240 has an outer layer of Mylar film 242 to protect a leuco dye strip 244. A thermometer strip 246 is placed next to the leuco dye strip 244. An adhesive layer 248 is fixed to one side of the Mylar film 240. The adhesive layer 248 permits adhesion of the thermometric measuring device 240 to a beer keg 1. A removable adhesive layer protection strip 252 prevents the adhesive layer 248 from adhering to any other surface until use of the thermometric measuring device 240 is desired on a beer keg 1. Alternatively, the adhesive layer 248 may be replaced with a magnetic strip.

The thermometric measuring device 240 operates at a discrete temperature rather than a temperature range. By operating at a discrete temperature the thermometric measuring device 240 is more reliable in indicating fluid level than a device operating over a wide range of temperatures. Thus, the thermometric measuring device 240 may be set to detect a temperature at for example 48° F. The discrete temperature need not be the exact temperature of the liquid or gas in the beer keg 1 or a refrigerator in which the beer keg 1 is located. The discrete temperature is preferably a few degrees warmer than the temperature of the liquid or gas in the beer keg 1.

If desired a thermometer strip 260 may also be employed in conjunction with the thermometric measuring device 240. The thermometer strip 260 is employed to determine if the liquid in the beer keg 1 is a suitable temperature for serving.

The advantages in utilizing the leuco dyes in the present invention are the dyes provide a rapid color change from black to green in the range of temperatures at which beer is stored. After the application of water such as from a damp cloth or water from an aqueous based in a spray bottle the green color rapidly changes back to black. Thus, there is little risk of a false reading after a substantial amount of beer has been removed from a beer keg.

The color green is particularly advantageous in that the beer kegs are usually stored in an area where there is limited lighting. The purpose of limited lighting is because bottle beer may also be stored in the same area. As beer deteriorates in an area of substantial lighting a cooler will not be well lit. The green coloration of the temperature-measuring device provides an adequate color difference under conditions of low lighting to permit an accurate determination of the volume of beer remaining in a keg. A distinct advantage lies in utilizing the leuco dyes over cholesteric materials that tend to reflect light, as compared to the leuco dye materials, thus making it difficult to observe the color change indicating the volume of beer remaining in a keg with utilizing the cholesteric materials. Chiralnematic liquid crystals may be substituted herein.

What is claimed is:

1. A method for determining the level of a foamable fluid in a container comprising:
    obtaining a container having an outlet for a first fluid and an inlet for a second fluid;
    said container having a first fluid region therein;
    a first fluid being present at an original level in said first fluid region of said container;
    said container, for when in use, having said first fluid at least partially removed from said container thereby forming a second fluid region;
    placing on at least one exterior surface of said container at least one temperature-measuring device operating at a single discrete temperature in the range of 45° F. to 80° F.;
    at least one said temperature-measuring device being located in a region of said container where said second fluid region is formed by removal of said first fluid;
    initially observing a first temperature in said first fluid region of said container when said first fluid is present in said first fluid region of said container;
    subsequently observing a second temperature in said second fluid region of said container after a portion of said first fluid has been removed;
    correlating the difference between said first temperature and said second temperature to the level of said first fluid in said container; and,
        provided further that the temperature measuring device is based on a member selected form the group consisting of a leuco dye, a clearing point liquid crystal, cholesteric liquid crystal, chiralnematic liquid crystal, and mixtures thereof.

2. The method for determining the level of said first fluid in said container according to claim 1 wherein said first fluid is at least partially withdrawn through said outlet between the time of observing said first temperature and said second temperature.

3. The method for determining the level of said first fluid in said container according to claim 1 wherein the second fluid is introduced through said inlet between the time of observing said first temperature and said second temperature.

4. The method for determining the level of said first fluid in said container according to claim 1 wherein said second fluid is a gas.

5. The method for determining the level of said first fluid in said container according to claim 1 wherein said temperature-measuring device is adhered to an outer surface of said container as a magnetic strip.

6. The method for determining the level of said first fluid in a container according to claim 1 wherein a plurality of temperature-measuring device are sequentially located in the regions of said container where said second fluid region is formed by removal of said first fluid.

7. The method for determining the level of said first fluid in a container according to claim 1 wherein the member comprises one or more of one or more of: leucoauramine, diarylphthalide, polyarylcarbinole, acylauramine, arylauramine, Rhodamine B lactam, indoline, spiropyran, and fluoran; Crystal Violet lactone (CVL), Malachite Green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]-amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)-fluoran, 2-chloro-6-(diethylamino)fluoran, 7-(N,N-dibenzylamino)-3-(N,N-diethylamino)fluoran, 3,6-bis (diethylamino)fluoran, gamma-(4'-nitroanilino)lactam, 3-diethylaminobenzo[a]-fluoran, 3-dietylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl)phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethyamino-6-benzyloxyfluoran, 1,2-benzo-6-diethyaminofluoran, 3,6-di-p-toluidino-4,5-dimetylfluoran, phenylhydrazide-gamma-lactam, and 3-amino-5-methylfluoran; 3-Z-4-$Z_1$-5-$Z_2$-5-(1-R-2-$R_1$-5/6-Y-3-indolyl)-2(5H)-furanones; 3,5-bis(1-R-2-$R_1$-5/6-Y-3-indolyl)-2-(3H)-furanones; 2,4-bis(1-R-2-$R_1$-5/6-Y-3-indolyl)-4-oxobutanoic acids; 4-(1-R-2-$R_1$-5/6-Y-3-indolyl)-2,3-dichloro-4-oxo-2-butenoic acids; phenols, metal phenolates, metal carboxylates, benzophenones, sulfonic acids, sulfonates, phosphoric acids, metal phosphates, acidic phosphoric esters, acidic phosphoric ester metal salts, phosphorous acids, and metal phosphites; gallic acid; gallate such as methyl gallates, ethyl gallate, n-propyl gallate, i-propyl gallate, and butyl gallate; dihydroxybenzoic acids and their esters such as 2,3-dihydroxybenzoic acid and 3,5-dihydroxybenzoic acid methyl; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis [(3,5-dimethyl-4-hydroxyphenyl)methyl]-1,2,3-benzenetriol, 4,4'-[1,4-phenylenebis(1-methylethylidene)bis (benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol, and methylenetris-p-cresol; polyalkylene oxide (PAO), Chr-L[PAO-L-Chr]$_n$ where each Chr which may be the same or different is a chromophore, each PAO which may be the same or different is a polyalkylene oxide moiety, each L is a bond or organic linking group connecting at least one PAO to at least one Chr, and n is an integer having a value of at least 1; styrene-methacrylic acid copolymer; polyethylene, chlorinated polyethylene, ethylene-vinyl acetate copolymer and ethylene-acrylic acid-maleic anhydride copolymer, polybutadienes, polyesters such as polyethylene terephthalate, polybutylene terephthalate and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluorine resins, acrylic resins, methacrylic resins, acrylonitrile copolymers, styrenecopolymers such as polystyrene, halogenated polystyrene and styrene methacrylic acid copolymer, acetal resins, polyamides such as nylon 66, polycarbonates, cellulose resins, phenol resins, urea resins, epoxy resins, polyurethane resins, diaryl phthalate resins, silicone resins, polyimide amides, polyether sulfones, polymethyl pentenes, polyether imides, polyvinyl carbazoles and amorphous polyolefin.

8. The method for determining the level of said first fluid in said container according to claim 1 where said container is present in a location of low humidity at the time of the initial observing of the first temperature in said first fluid region of said container when said first fluid is present in said first fluid region of said container and at the time the subsequent observation of the second temperature in said second fluid region of said container after a portion of said first fluid has been removed.

9. The method for determining the level of said first fluid in said container according to claim 1 wherein said first fluid is a liquid.

10. The method for determining the level of said first fluid in said container according to claim 1 wherein said first fluid comprises beer and wherein said second fluid comprises carbon dioxide.

11. The method for determining the level of said first fluid in said container according to claim 1 additionally comprising the step of applying water to the temperature-measuring device with a water moistened cloth or a spray bottle wherein the temperature of the water applied is from 45° F. to 80° F.

12. The method for determining the level of said first fluid in said container according to claim 1 wherein the temperature-measuring device is black color at one temperature and green at another temperature.

13. A fluid dispensing assembly comprising:
a sealed container, for when in use, containing a liquid under pressure;
said sealed container having an exterior surface;
said sealed container having input means for maintaining a constant pressure within sealed container
said exterior surface of said sealed container having a heightwise dimension and a widthwise dimension;
at least one temperature-measuring device positioned heightwise dimension on said exterior surface, provided further that said temperature-measuring device measures a single discrete temperatures in the range of about from 45° F. to 80° F.; and,
provided further that the temperature measuring device is based on a member selected form the group consisting of a leuco dye, a clearing point liquid crystal, cholesteric liquid crystal, and mixtures thereof.

14. The fluid dispensing assembly according to claim 13 wherein said input means supplies carbon dioxide to said sealed container.

15. The fluid dispensing assembly according to claim 13 the member comprises one or more of: leucoauramine, diarylphthalide, polyarylcarbinole, acylauramine, arylauramine, Rhodamine B lactam, indoline, spiropyran, and fluoran; Crystal Violet lactone (CVL), Malachite Green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]-amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)-fluoran, 2-chloro-6-(diethylamino)fluoran, 7-(N,N-dibenzylamino)-3-(N,N-diethylamino)fluoran, 3,6-bis(diethylamino)fluoran, gamma-(4'-nitroanilino)lactam, 3-diethylaminobenzo[a]-fluoran, 3-dietylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azapht halide, 3-(4-diethylaminophenyl)-3-(1-ethyl-2-methylindole-3-yl)phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethyamino-6-benzyloxyfluoran, 1,2-benzo-6-diethyaminofluoran, 3,6-di-p-toluidino-4,5-dimetylfluoran, phenylhydrazide-gamma-lactam, and 3-amino-5-methylfluoran; 3-Z-4-$Z_1$-5-$Z_2$-5-(1-R-2-$R_1$-5/6-Y-3-indolyl)-2(5H)-furanones; 3,5-bis(1-R-2-$R_1$-5/6-Y-3-indolyl)-2-(3H)-furanones; 2,4-bis(1-R-2-$R_1$-5/6-Y-3-indolyl)-4-oxobutanoic acids; 4-(1-R-2-$R_1$-5/6-Y-3-indolyl)-2,3-dichloro-4-oxo-2-butenoic acids; phenols, metal phenolates, metal carboxylates, benzophenones, sulfonic acids, sulfonates, phosphoric acids, metal phosphates, acidic phosphoric esters, acidic phosphoric ester metal salts, phosphorous acids, and metal phosphites; gallic acid; gallate such as methyl gallates, ethyl gallate, n-propyl gallate, i-propyl gallate, and butyl gallate; dihydroxybenzoic acids and their esters such as 2,3-dihydroxybenzoic acid and 3,5-dihydroxybenzoic acid methyl; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol, and methylenetris-p-cresol; polyalkylene oxide (PAO), Chr-L[PAO-L-Chr]$_n$, where each Chr which may be the same or different is a chromophore, each PAO which may be the same or different is a polyalkylene oxide moiety, each L is a bond or organic linking group connecting at least one PAO to at least one Chr, and n is an integer having a value of at least 1; styrene-methacrylic acid copolymer; polyethylene, chlorinated polyethylene, ethylene-vinyl acetate copolymer and ethylene-acrylic acid-maleic anhydride copolymer, polybutadienes, polyesters such as polyethylene terephthalate, polybutylene terephthalate and polyethylene naphthalate, polypropylenes, polyisobutylenes, polyvinyl chlorides; polyvinylidene chlorides, polyvinyl acetates, polyvinyl alcohols, polyvinyl acetals, polyvinyl butyrals, fluorine resins, acrylic resins, methacrylic resins, acrylonitrile copolymers, styrenecopolymers such as polystyrene, halogenated polystyrene and styrene methacrylic acid copolymer, acetal resins, polyamides such as nylon 66, polycarbonates, cellulose resins, phenol resins, urea resins, epoxy resins, polyurethane resins, diaryl phthalate resins, silicone resins, polyimide amides, polyether sulfones, polymethyl pentenes, polyether imides, polyvinyl carbazoles and amorphous polyolefin.

* * * * *